(12) United States Patent
Retief

(10) Patent No.: US 11,995,458 B1
(45) Date of Patent: May 28, 2024

(54) COMPILING USER CODE AS AN EXTENSION OF A HOST APPLICATION IN A BROWSER ENVIRONMENT

(71) Applicant: Bentley Systems, Incorporated, Exton, PA (US)

(72) Inventor: Stefan Retief, Vista, CA (US)

(73) Assignee: Bentley Systems, Incorporated, Exton, PA (US)

(*) Notice: Subject to any disclaimer, the term of this patent is extended or adjusted under 35 U.S.C. 154(b) by 67 days.

(21) Appl. No.: 17/338,116

(22) Filed: Jun. 3, 2021

(51) Int. Cl.
*G06F 9/455* (2018.01)
*G06F 8/41* (2018.01)
*G06F 16/11* (2019.01)

(52) U.S. Cl.
CPC ............ *G06F 9/45529* (2013.01); *G06F 8/41* (2013.01); *G06F 16/11* (2019.01)

(58) Field of Classification Search
CPC ......... G06F 9/45529; G06F 8/41; G06F 16/11
See application file for complete search history.

(56) References Cited

U.S. PATENT DOCUMENTS

| | | | |
|---|---|---|---|
| 7,971,194 B1 | 6/2011 | Gilboa | |
| 8,510,378 B2 | 8/2013 | Colton et al. | |
| 8,527,860 B1 | 9/2013 | Colton et al. | |
| 8,667,405 B2 | 3/2014 | Roytman | |
| 8,756,579 B1 | 6/2014 | Colton et al. | |
| 10,467,027 B1* | 11/2019 | Wang | G06F 8/41 |
| 2003/0167355 A1* | 9/2003 | Smith | G06F 8/20 |
| | | | 719/328 |
| 2011/0082984 A1* | 4/2011 | Yuan | G06F 16/9574 |
| | | | 711/147 |
| 2013/0275942 A1* | 10/2013 | Trebas | G06F 9/45529 |
| | | | 717/115 |
| 2014/0053056 A1* | 2/2014 | Weber | G06F 40/143 |
| | | | 715/234 |

(Continued)

OTHER PUBLICATIONS

"Properties of Window Object," GeeksforGeeks, retrieved from the Internet: <https://www.geeksforgeeks.org/properties-of-window-object/>, Aug. 31, 2021, pp. 1-5.

(Continued)

*Primary Examiner* — Wei Y Zhen
*Assistant Examiner* — Brahim Bourzik
(74) *Attorney, Agent, or Firm* — Cesari and McKenna, LLP; James A. Blanchette

(57) ABSTRACT

In an example embodiment, a technique is provided for compiling user code. A browser, executing on a local computing device, receives a request to compile the user code. A bundler, executing in the browser, retrieves contents of the user code and dependencies of the user code on one or more host packages of a host application. The bundler transforms, compiles and bundles the user code to produce a compiled bundle. The transforming imports each host package as a property of a global window object of the browser, wherein the property has a name that includes the host package name appended with a predetermined string, and a value that indicates an entry point into the host package. The compiles the user code as an extension of the host application in order to utilize the host packages in an already compiled form. The compiled bundle is then provided as an output.

20 Claims, 18 Drawing Sheets

(56) References Cited

U.S. PATENT DOCUMENTS

| | | | | |
|---|---|---|---|---|
| 2015/0143348 A1* | 5/2015 | You | ............................ | G06F 8/41 |
| | | | | 717/146 |
| 2017/0147324 A1* | 5/2017 | Weber | ...................... | G06F 8/656 |
| 2018/0336348 A1* | 11/2018 | Ng | ........................... | G06F 21/52 |
| 2018/0349149 A1* | 12/2018 | Chute | ................... | G06F 9/4401 |

OTHER PUBLICATIONS

"The Window Object," W3Schools, Refsnes Data, retrieved from the Internet: <https://www.w3schools.com/jsref/obj_window.asp>, retrieved from the Internet on Dec. 19, 2022, pp. 1-3.

* cited by examiner

```
const SimpleReactComponent = () => {
  return (EXTERNAL:react.createElement("h1", null, "Hello World!"));
};

export default SimpleReactComponent;

function $styleInject(){[const e=document.head||document.getElementsByTagName("head")[0],t=document.getElementById("rollup-style-injector");t&&e.removeChild(t)]}
$styleInject();
(JAVASCRIPT)
```

250

258

260 blob:https://www.itwinjs.org/28518372-3ae6-4ca3-b28b-d8fb4b365f7f

FROM
FIG. 2B

FIG. 2C

```
const SimpleReactComponent = () => {
    return (EXTERNAL!react.createElement("h1", null, "Hello World"));
};
export default SimpleReactComponent;

function $styleEject(){const e=document.head||document.getElementsByTagName("head")[0],t=document.getElementById("rollup-style-injector");t&&e.removeChild(t)};
$styleEject();
```
(JAVASCRIPT)

FROM
FIG. 3D

FIG. 3E

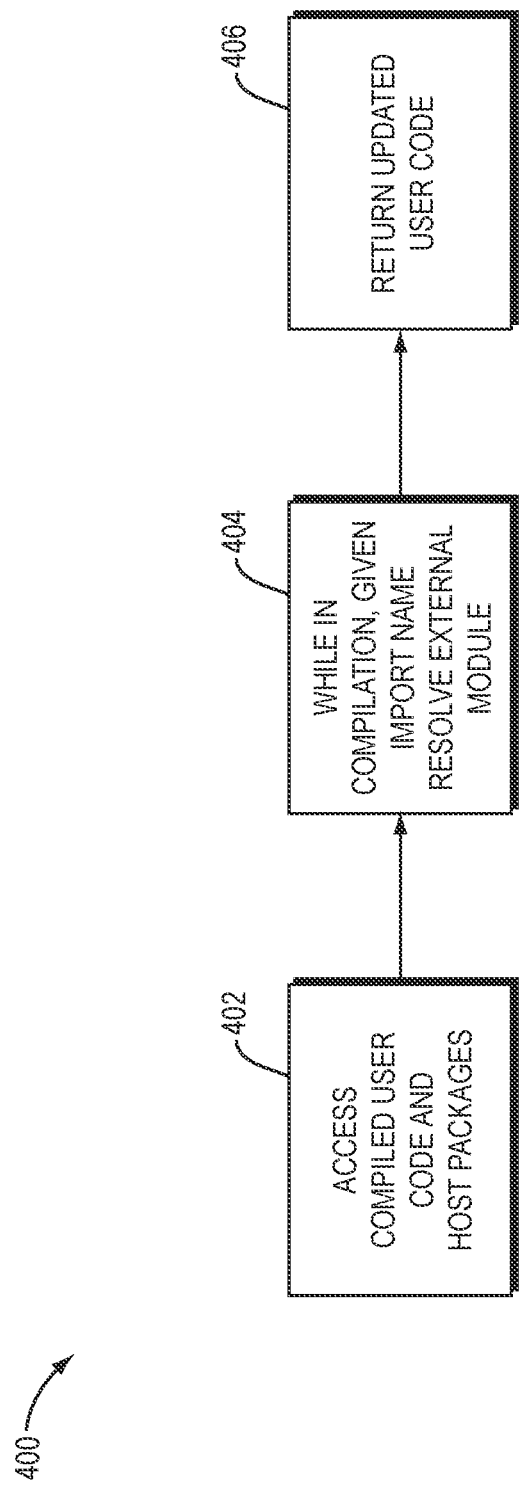

```
const SimpleReactComponent = () => {
    return (react.createElement("h1", null, "Hello World!"));
};
export default SimpleReactComponent;
(JAVASCRIPT)
```

```
import { ExternalModule, InternalModule, IModule, TypedefModule } from "@bentley/monaco-editor";
const modules: IModule[] = [
    new InternalModule("react", import(/* webpackMode: "eager" */ "react")),
    new InternalModule("react-dom", import(/* webpackMode: "eager" */ "react-dom")),
    new ExternalModule("@types/react"),
    new ExternalModule("@types/react-dom"),
]
export default modules;
(TYPESCRIPT)
```

FIG. 4B

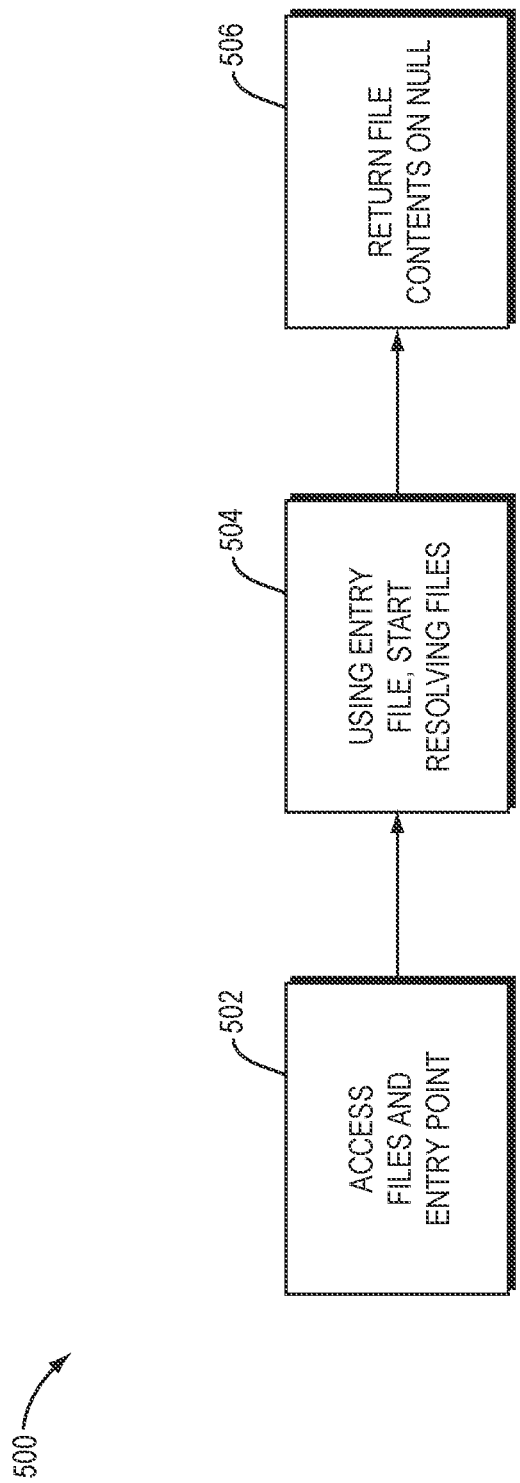

COMPILING USER CODE AS AN EXTENSION OF A HOST APPLICATION IN A BROWSER ENVIRONMENT

BACKGROUND

Technical Field

The present disclosure relates generally to code compilation, and more specifically to techniques for compiling user code, such as user code of a custom digital twin web application.

Background Information

As part of the construction and/or operation of infrastructure (e.g., buildings, factories, roads, railways, bridges, electrical and communication networks, equipment, etc.) it is often desirable to create digital twins. A digital twin is a digital representation of infrastructure that is typically synchronized with information representing current status, working condition, position or other qualities. By examining and analyzing the digital twin, one may better understand what is happening with the corresponding infrastructure in the real world.

It is often desirable to create custom web applications (i.e. applications that can be executed in a browser environment) to create and use digital twins. To assist with this task, a digital twin web development framework, such as the iTwin.js web development framework provided by Bentley Systems, Inc., may be used. The digital twin web development framework may provide access to remote packages that can assist with difficult tasks and speed development (e.g., in comparison to developing web applications from scratch).

Custom digital twin web applications may be coded in a dynamic translation programming language adapted for web development, such as JavaScript, or more commonly in a syntactical superset thereof, such as TypeScript, which requires compilation into the underlying dynamic translation programming language (e.g., into JavaScript) before execution. Styles (e.g., Syntactically Awesome Style Sheets (SASS) and/or Cascading Style Sheets (CSS)) may be applied to the user code. The user code may make use of remote packages.

It is often desirable to use a browser to edit, compile (and ultimately execute) a custom digital twin web application, for example, in an online sandbox. A browser environment typically handles compilation in one of two ways: in-browser or using a remote backend. With an in-browser solution, the user enters code (user code) into an editor in the browser, the user provides application configuration as part of the user code, all relevant remote packages are downloaded from a cloud-based repository, the user code is validated, the user code and remote packages are compiled and bundled in the browser, and finally an output of compiled bundled code is served as a new application. With a remote backend solution, the user enters code (user code) in a editor in the browser, the user provides application configuration as part of the user code, the user code is validated, the user code is uploaded from the browser to a cloud-based remote backend, the remote backend obtains all relevant remote packages from the cloud-based repository, the user code and remote packages are then compiled and bundled remotely by the backend, and finally an output of compiled bundled code is served as a new application.

However, these approaches to compiling user code present a number of problems. A first problem is successfully compiling the code. In-browser solutions are often lightweight and not compatible with all inputs (e.g., all Typescript inputs), such that compilation may simply fail for complex inputs. A second problem is excessive compile time. Compiling user code that uses large remote packages may consume significant time to compile such packages. This is generally the case regardless of whether compilation is handled in-browser or using a remote backend. A third problem is the burden of application configuration. Typically, when the user enters code in the editor the user is required to provide all the application configuration information of a new application. In the case of a custom digital twin web application in an online sandbox, the application configuration may include information for logging into and accessing models used by the digital twin. Providing the application configuration information is often time consuming, and discouraged new users from experimenting in the online sandbox. If required configuration is not provided, a non-functioning application may be produced.

Accordingly, there is a need for improved techniques for compiling user code, such as user code of a custom digital twin web application.

SUMMARY

In example embodiments, techniques are provided for compiling user code in a browser environment by treating the user code as an extension of a host application (rather than a new application). Host packages that are part of the host application have already been compiled. As such, they may be exposed and referenced during in-browser compilation of the user code, rather than compiled in-browser. Further, the host application typically already has application configuration. As such, it may be utilized with the user code, rather then requiring a user to provide application configuration. Among other benefits, the techniques may permit compilation of complex user code in-browser without additional requests to a remote backend, may reduce compilation time, and may remove the need for the user to supply application configuration. The techniques may be applicable to compilation of a custom digital twin web applications in an online sandbox, and also other types of applications in other types of browser environments.

In one specific example embodiment, a browser, executing on a local computing device, receives a request to compile user code. A bundler, executing in the browser, retrieves contents of the user code and dependencies of the user code on one or more host packages of a host application. The bundler transforms, compiles and bundles the user code to produce a compiled bundle. The transforming imports each host package as a property of a global window object of the browser, wherein the property has a name that includes the host package name appended with a predetermined string, and a value that indicates an entry point into the host package. The compiler compiles the user code as an extension of the host application in order to utilize the host packages in an already compiled form. The compiled bundle is provided as an output.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which:

FIGS. 2B-2C are a progression of code snippets forming a running example that illustrates operations and effects of the steps of FIG. 2A;

FIGS. 3B-3E are a progression of code snippets and specific sub-steps forming a running example that illustrates operations and effects of the steps of FIG. 3A;

FIG. 4A is a flow diagram of an example sequence of steps detailing operations performed as part of FIG. 3A by an external globals plugin to utilize already compiled host packages and existing application configuration of a host application;

FIGS. 4B-4C are a progression of code snippets and specific sub-steps forming a running example that illustrates operations and effects of the steps of FIG. 4A;

FIG. 5A is a flow diagram of an example sequence of steps detailing operations performed as part of FIG. 3A by a file resolver plugin to create a pseudo file system for retrieving files;

DETAILED DESCRIPTION

Figure 1:
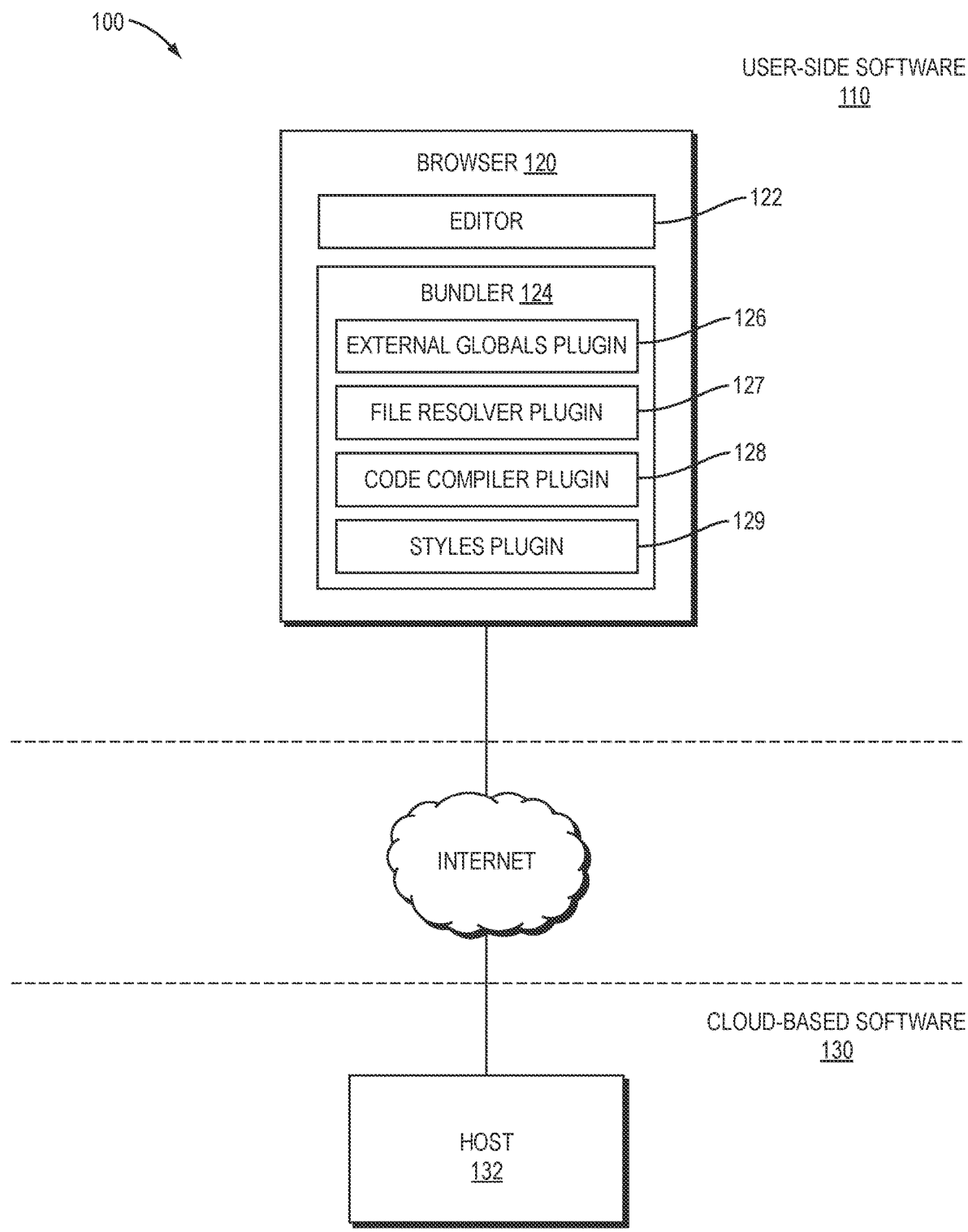
FIG. 1 is a high-level block diagram of an example architecture that may be used with the present techniques for compiling user code in a browser environment as an extension of a host application.

FIG. 1 is a high-level block diagram of an example architecture 100 that may be used with the present techniques for compiling user code in a browser environment as an extension of a host application. The architecture may be divided into user-side software 110 executing on a computing device arranged locally a user (herein a "local computing device"), and cloud-based software 130 executing on one or more computing devices accessible over the Internet (herein a "cloud-based computing device"). Each computing device may include processors and memory/storage, in some cases a display screen, and other hardware (not shown) for executing software, storing data, and, in some cases, displaying information. The user-side software 110 may include a web browser (browser) 120 that provides an online sandbox. Among other software of the online sandbox, the browser 120 may execute an editor (e.g., a Monaco™ editor) 122 and a bundler 124 (e.g., a Rollup™ bundler). The bundler 124 may utilize a number of special plugins, including an external globals 126 that operates as a package loader capable of accessing host packages and exposing those packages, a file resolver plugin 127 that is capable of creating a pseudo file system for retrieving files when bundling, a code compiler plugin (e.g., a Typescript plugin) 128 that is capable of compiling code (e.g., transpiling Typescript to Javascript), and a styles plugin (e.g., SASS plugin) 129 that is capable of compiling styles (e.g., SASS to CSS). The cloud-based software 130 may include a host 132 that maintains a host application that includes already compiled host packages that may be exposed to the user code, and a pre-existing application configuration that may be utilized by the user code.

Figure 2A:
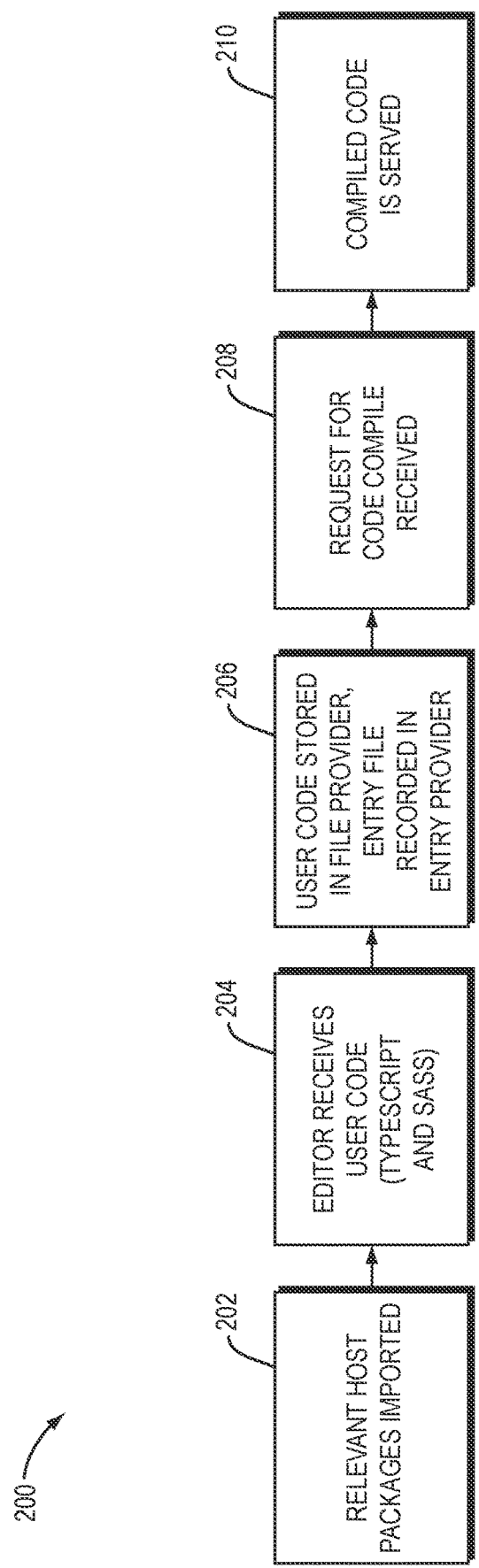
FIG. 2A is a flow diagram of an example high level sequence of steps for compiling user code in a browser environment as an extension of a host application.
Figure 2B:
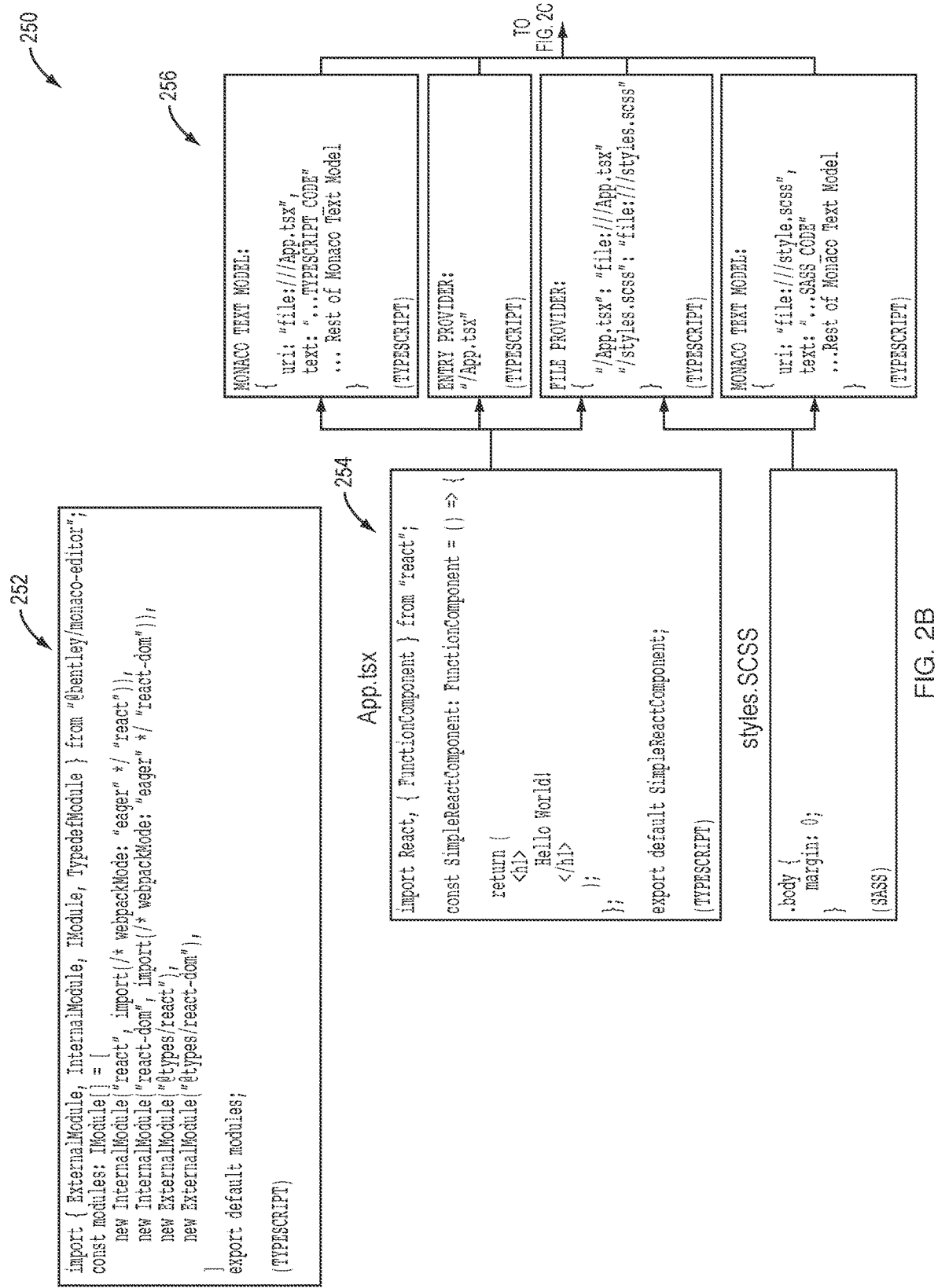

FIG. 2A is a flow diagram of an example high level sequence of steps 200 for compiling user code in a browser environment as an extension of a host application. FIGS. 2B-2C are a progression 250 of code snippets forming a running example that illustrates operations and effects of the steps 200 of FIG. 2A. At step 202 (and illustrated in snippet 252), relevant host packages are imported. At step 204, (and illustrated in snippet 254), the editor 122 receives code input by the user (user code). The user code may include code that requires compiling (or more specifically transpiling) (e.g., Typescript) and user styles (e.g., SASS). At step 206 (and illustrated in snippet 256), user code is stored in a file provider with a link to an editor text model, and a user specified entry point is recorded in an entry provider. At step 208 (and illustrated in snippet 258), a request to compile the code is received, and the bundler 124 and its plugins 126-129 compile and bundle the user code as an extension of the host application. At step 210 (and illustrated in snippet 260), a bundle of compiled code is output (e.g., a blob accessible via a Uniform Resource Locator (URL)). The compiled bundle may then be executed by the user in the browser (e.g., to create and use a digital twin in a display shown in the browser and for other purposes), stored for later user, or otherwise consumed.

Figure 3A:
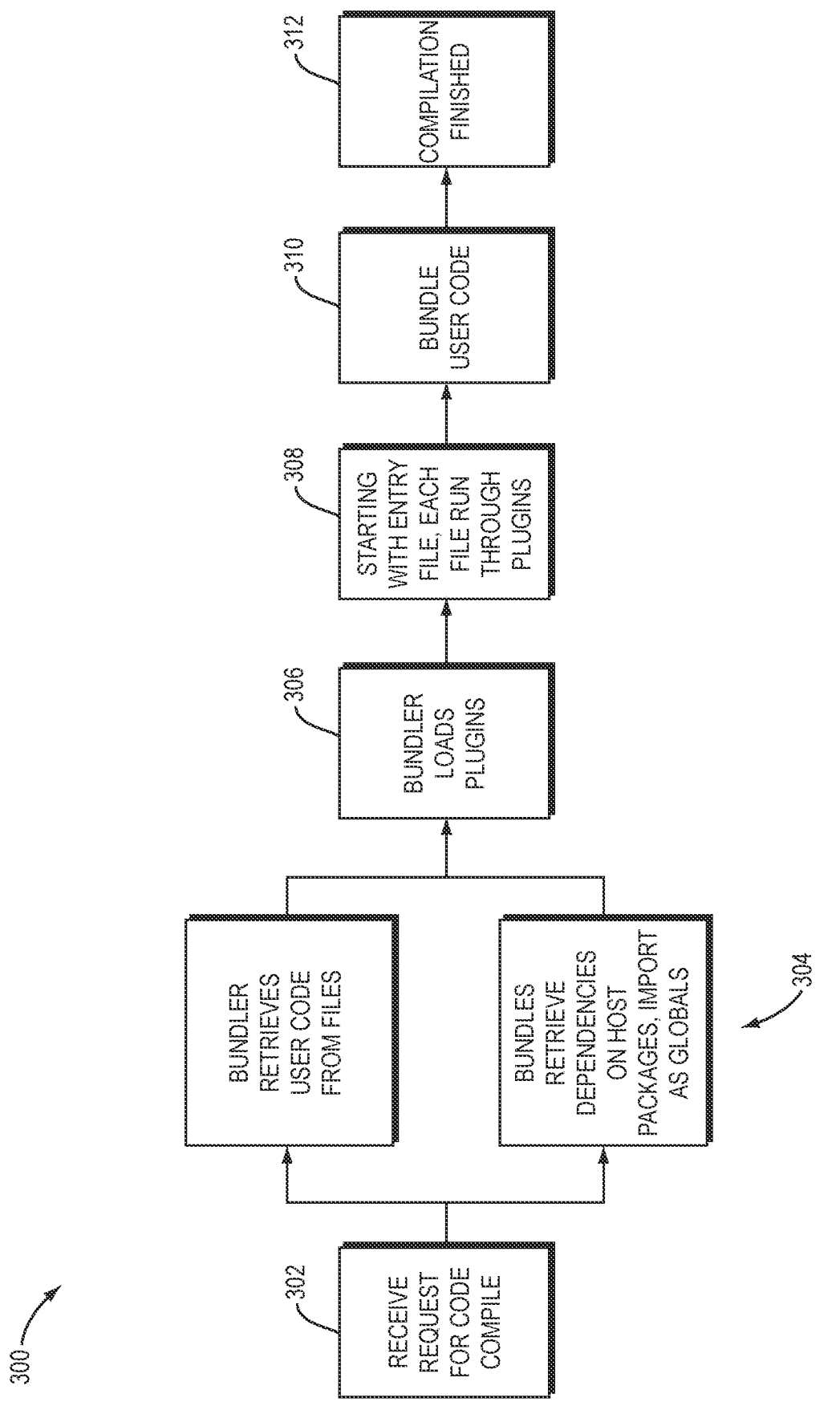
FIG. 3A is a flow diagram of an example sequence of steps detailing the compiling operations that may be performed as part of FIG. 2A.
Figure 3B:
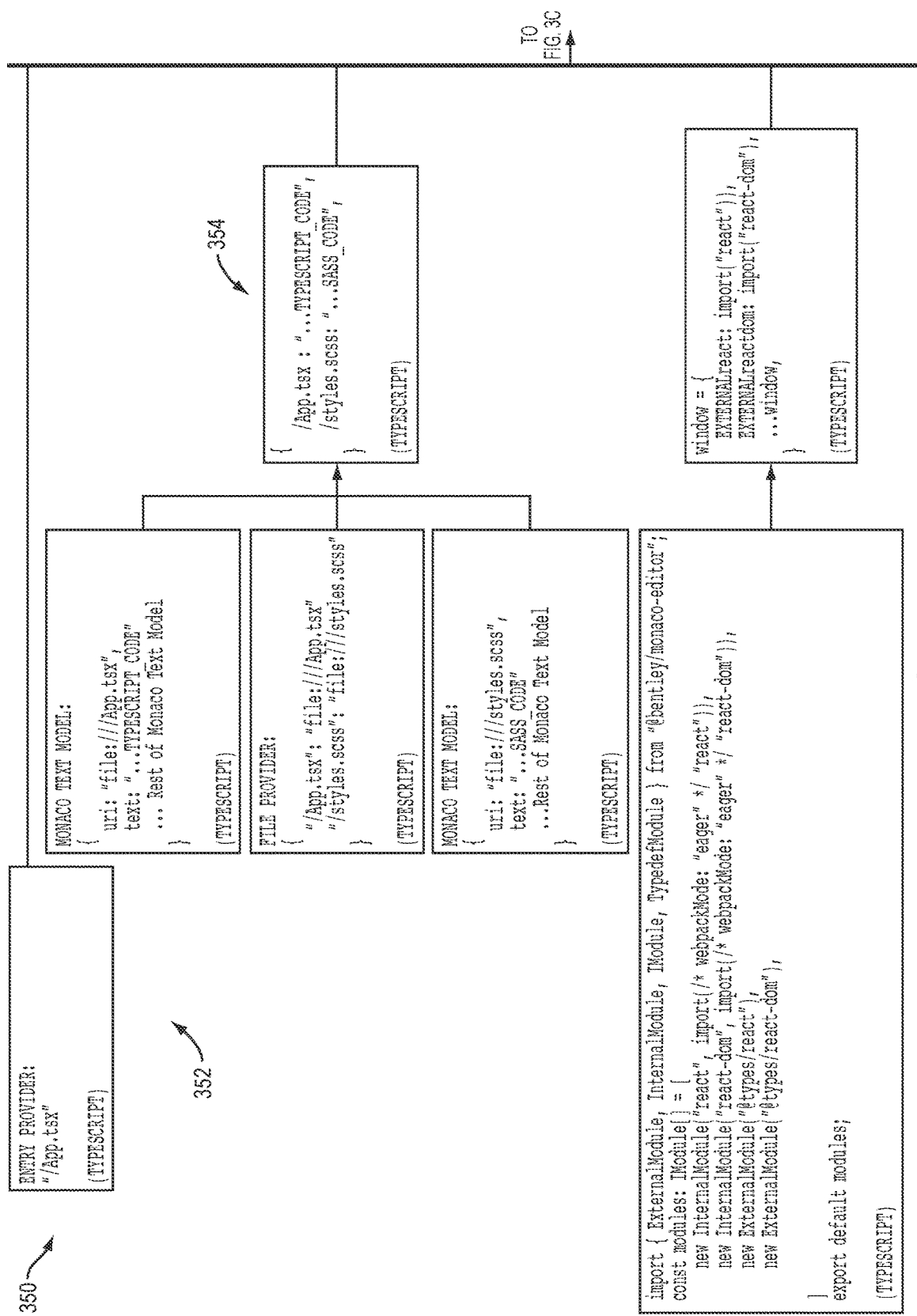
Figure 3C:
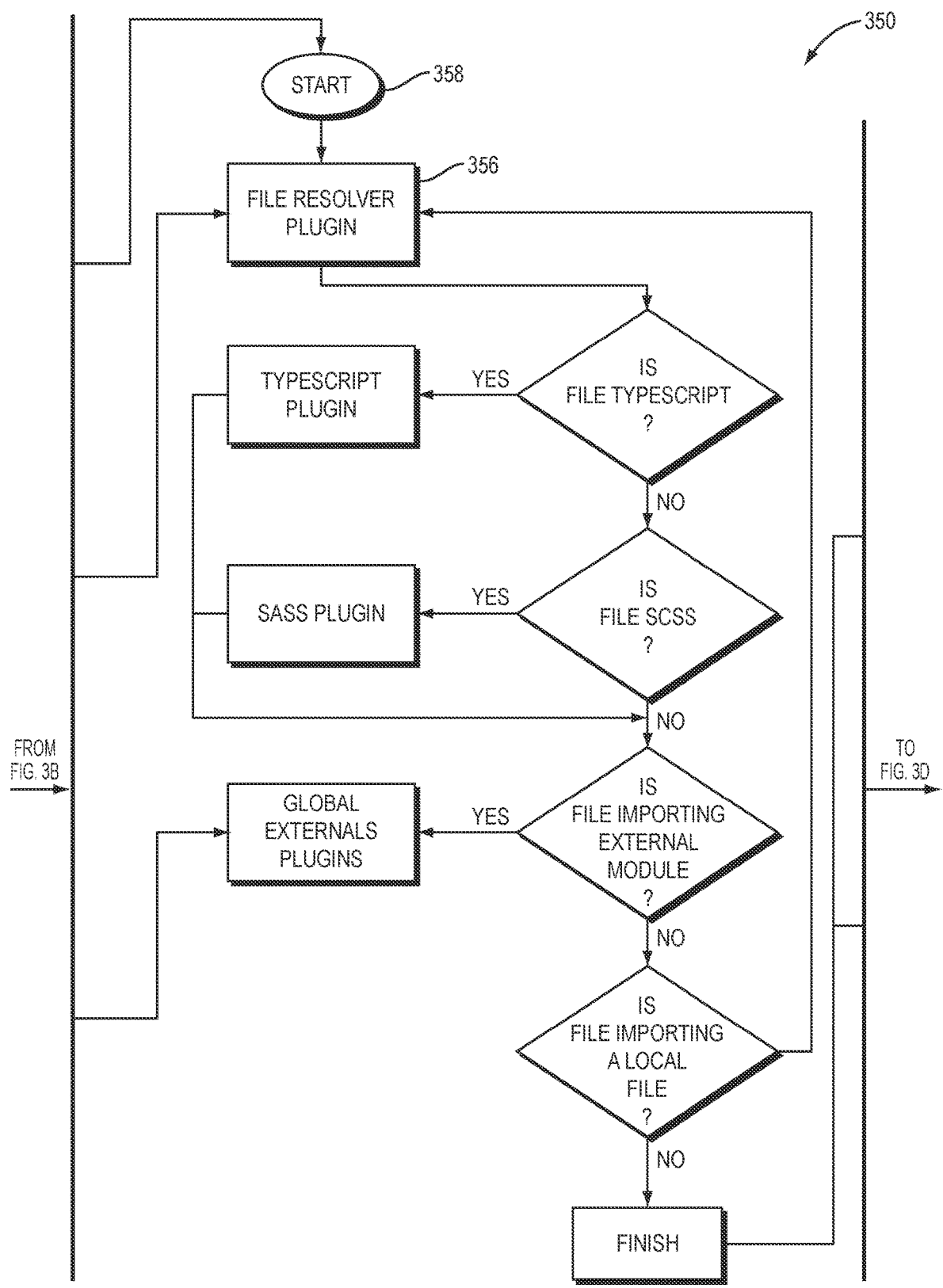
Figure 3D:
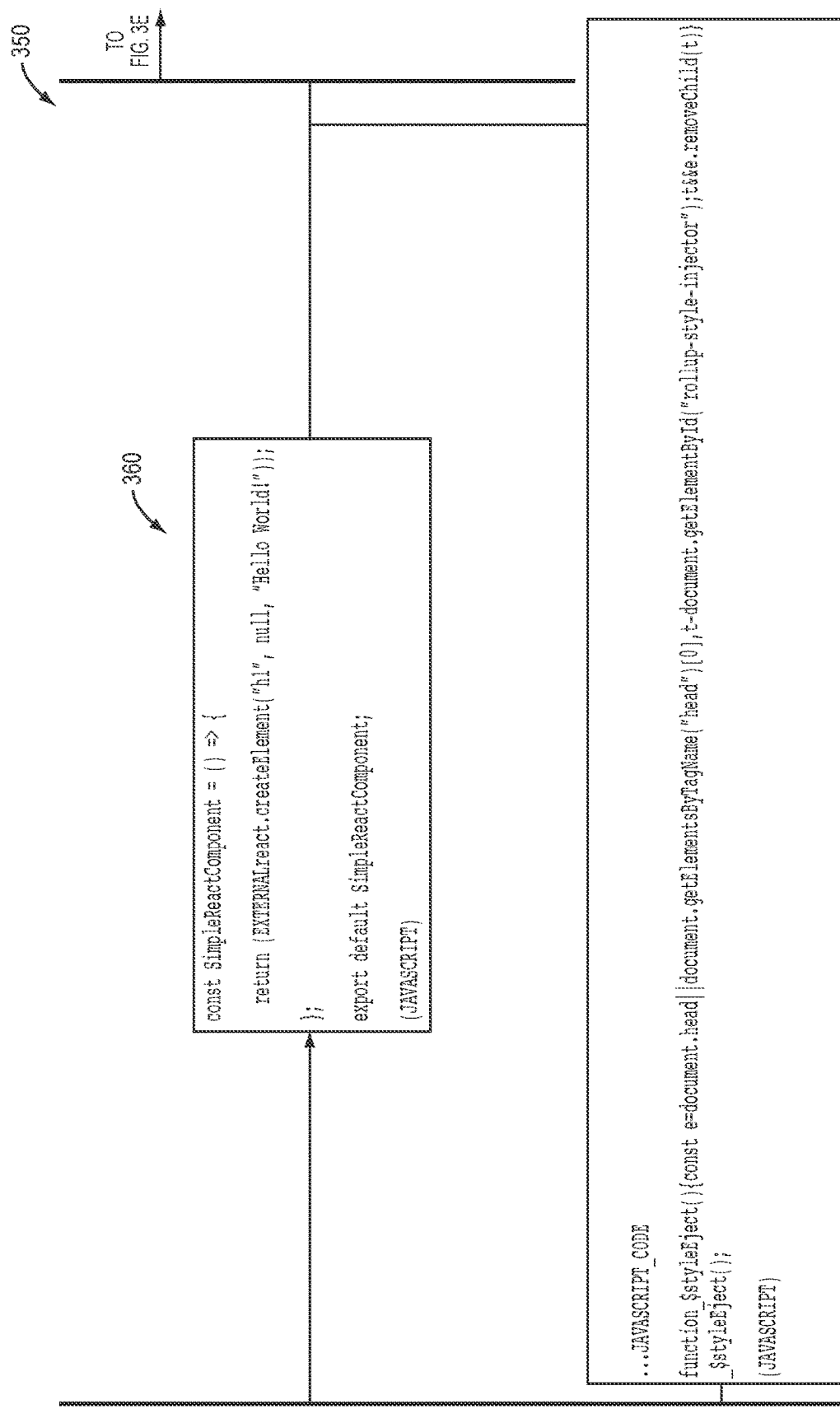

FIG. 3A is a flow diagram of an example sequence of steps 300 detailing the compiling operations that may be performed as part of FIG. 2A. FIGS. 3B-3E are a progression 350 of code snippets and specific sub-steps forming a running example that illustrates operations and effects of the steps 300 of FIG. 3A. At step 302 (and illustrated in snippet 352), the request to compile the code is received, along with the user code stored in the file provider, the user specified entry point in the entry provider, and the imported host packages. At step 304 (and illustrated in snippet 354), the bundler 124 accesses the user code file-by-file and retrieves dependencies on host packages of the host application. Each host package is already compiled as part of the host application. As explained in more detail below, the user code is compiled as an extension of the host application to utilized the already compiled host packages, and existing application configuration of the host application. To facilitate this, each host package name may be appended (e.g., prefixed) with a predetermined string (a magic string, such as the string "EXTERNAL"), and normalized to ensure it can be used as a valid variable name (e.g., in Javascript). Each host package is then provided as a property of the browser, with the normalized, appended (e.g., prefixed) host package name used as the property name, and an entry point into the host package used as the value. At step 306 (and illustrated in snippet 356), the bundler 124 loads the external globals plugin 126, file resolver plugin 127, code compiler plugin (e.g., Typescript plugin) 128, and styles plugin (e.g., SASS plugin) 129. At step 308 (and illustrated in snippet 358), starting with an entry file, each file of user code is run through the plugins 126-129, which operate upon them to transform them and compile them. At step 310 (and illustrated in snippet 360), the bundler 124 bundles compiled user code and the host application packages, creating a compiled bundle. At step 312 (and illustrated in snippet 362), compilation is finished and the bundler 124 provides the compiled bundle as an output.

Figure 4C:
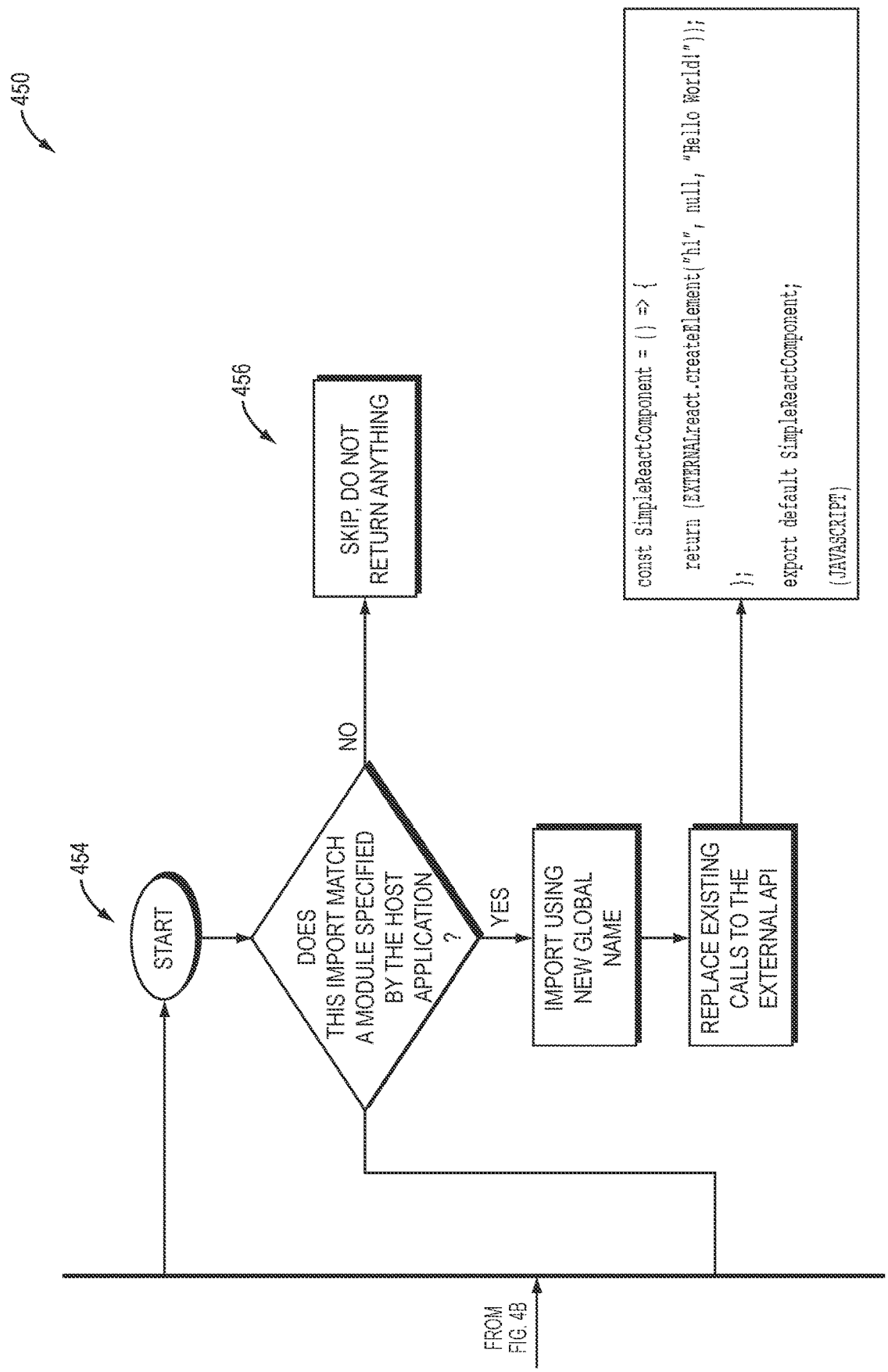

FIG. 4A is a flow diagram of an example sequence of steps 400 detailing operations performed as part of FIG. 3A by the external globals plugin 126 to utilize already compiled host packages and existing application configuration of the host application. FIGS. 4B-4C are a progression 450 of code snippets and specific sub-steps forming a running example that illustrates operations and effects of the steps 400 of FIG. 4A. Conventionally, it is difficult to allow a user to access host packages and application configuration of a host application. This is, in part, because host applications are often bundled (e.g., using a Webpack™ module bundler) with their own dictionary set, and no solution is provided for accessing the items outside of the compiled bundle that is served. To address this, a custom package loader (the external globals plugin 126) may be used, exposing host packages and application configuration to the browser. By exposing the host packages, the only compiling that may be required is of user code (and, if applicable, external packages not available from the host application). Likewise, the user may be freed from supplying application configuration.

At step 402 (and illustrated in snippet 452), compiled user code (e.g., Javascript) along with the host packages is accessed. At step 404 (and illustrated in snippet 454), for uncompiled user code (e.g., Typescript) undergoing compilation, modules are resolved. A check is performed if a module name matches that of a host package, and, if so, it is appended (e.g., prefixed) with a predetermined string (a magic string, such as the string "EXTERNAL"), and normalized to ensure it can be used as a valid variable name (e.g., in Javascript). Each normalized, appended (e.g., prefixed) host package name is then imported and used to replace existing calls to the host packages. To achieve this, each normalized, appended (e.g., prefixed) host package name may be provided as the property name and an entry point into the host package required for the user code used as the value. At step 406 (and illustrated in snippet 456), the updated code is returned, and compilation may proceed.

Figure 5B:
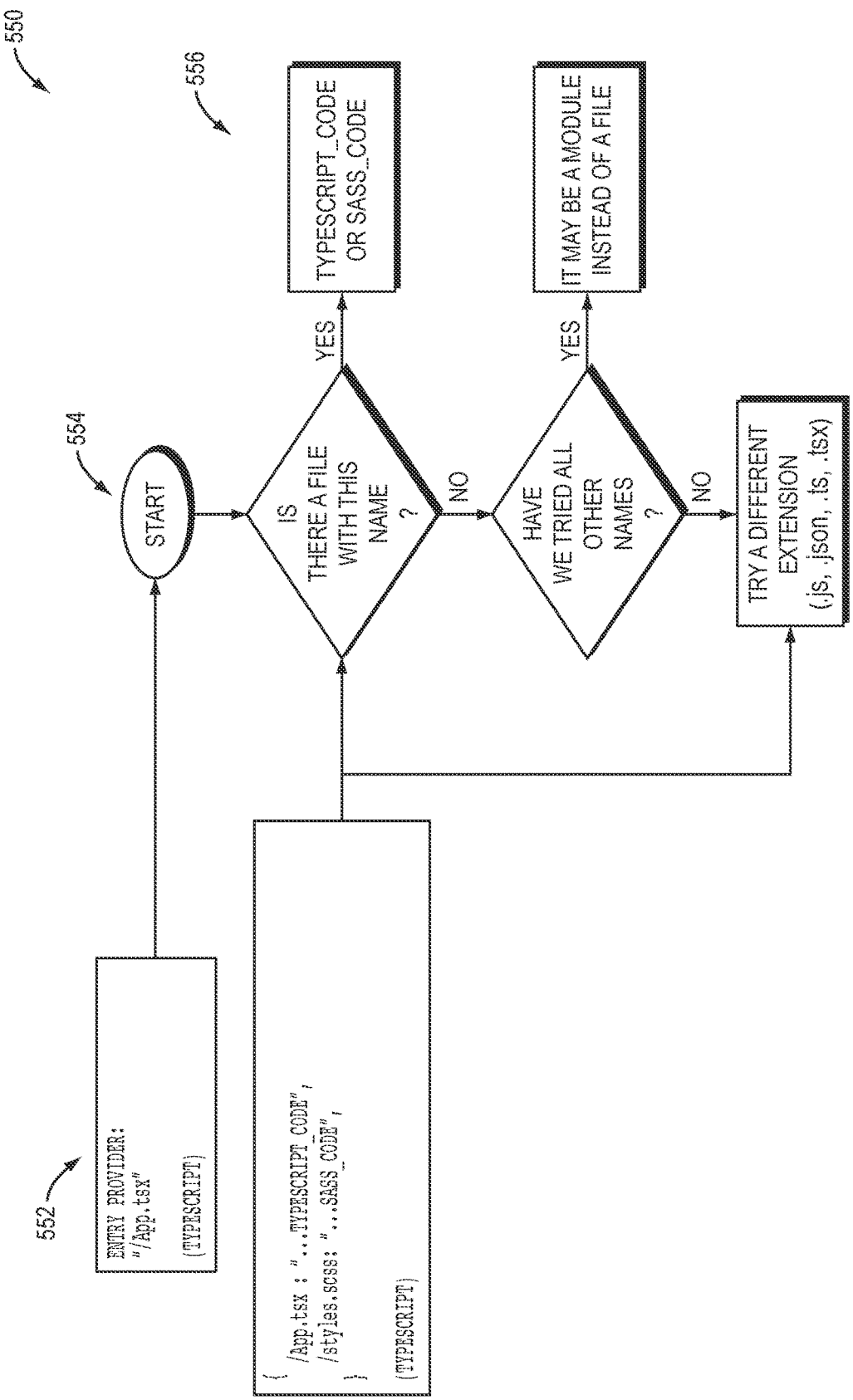
FIG. 5B is a progression of code snippets and specific sub-steps forming a running example that illustrates operations and effects of the steps of FIG. 5A.

FIG. 5A is a flow diagram of an example sequence of steps 500 detailing operations performed as part of FIG. 3A by the file resolver plugin 127 to create a pseudo file system for retrieving files. FIG. 5B is a progression 550 of code snippets and specific sub-steps forming a running example that illustrates operations and effects of the steps 500 of FIG. 5A. A browser typically does not provide a file system. However bundlers (e.g., a Rollup™ bundler) typically require some method for storing and retrieving files containing user code. The file resolver plugin 127 provides a pseudo file system that operates to store files and retrieve files upon request. At step 502 (and illustrated in snippet 552), files storing user code and a user specified entry point are accessed. At step 504 (and illustrated in snippet 554), using the entry file, files are resolved. A check may be performed if there is a file with a given name, checking all possible extensions. At step 506 (and illustrated in snippet 556), file contents are returned (e.g., Typescript code or SASS code) if the file exists. Otherwise, null may be returned (e.g., as the name may be a module instead of a file).

Figure 6A:
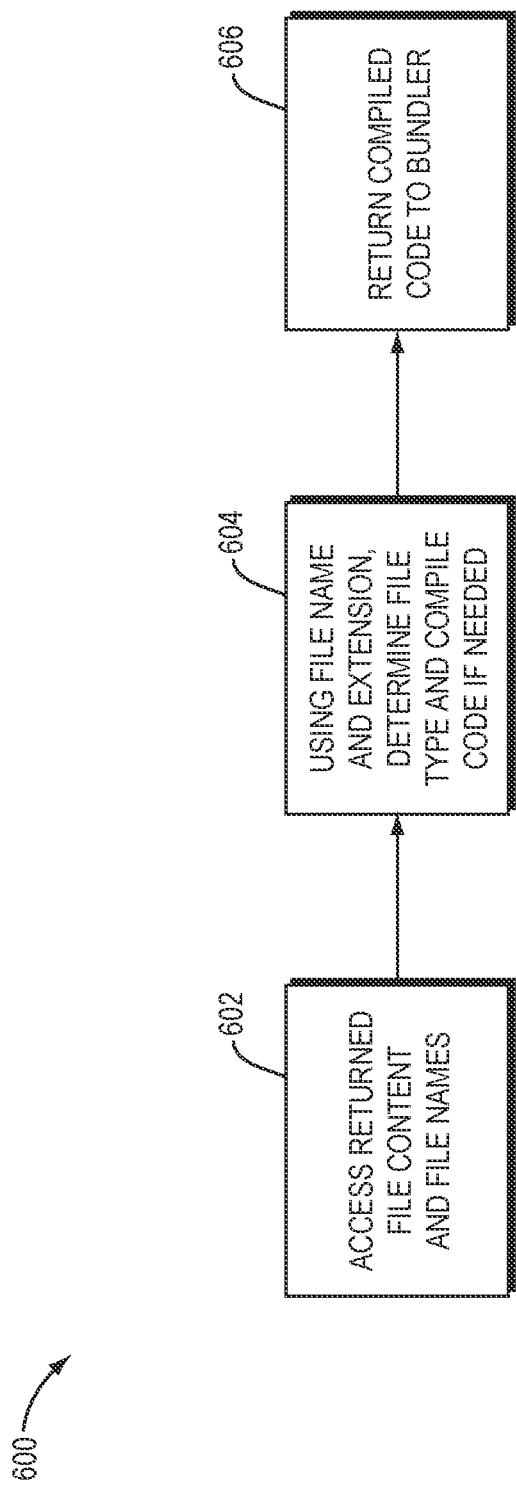
FIG. 6A is a flow diagram of an example sequence of steps detailing operations performed as part of FIG. 3A by a code compiler plugin (e.g., a Typescript plugin) to compile code (e.g., transpile Typescript to Javascript)
Figure 6B:
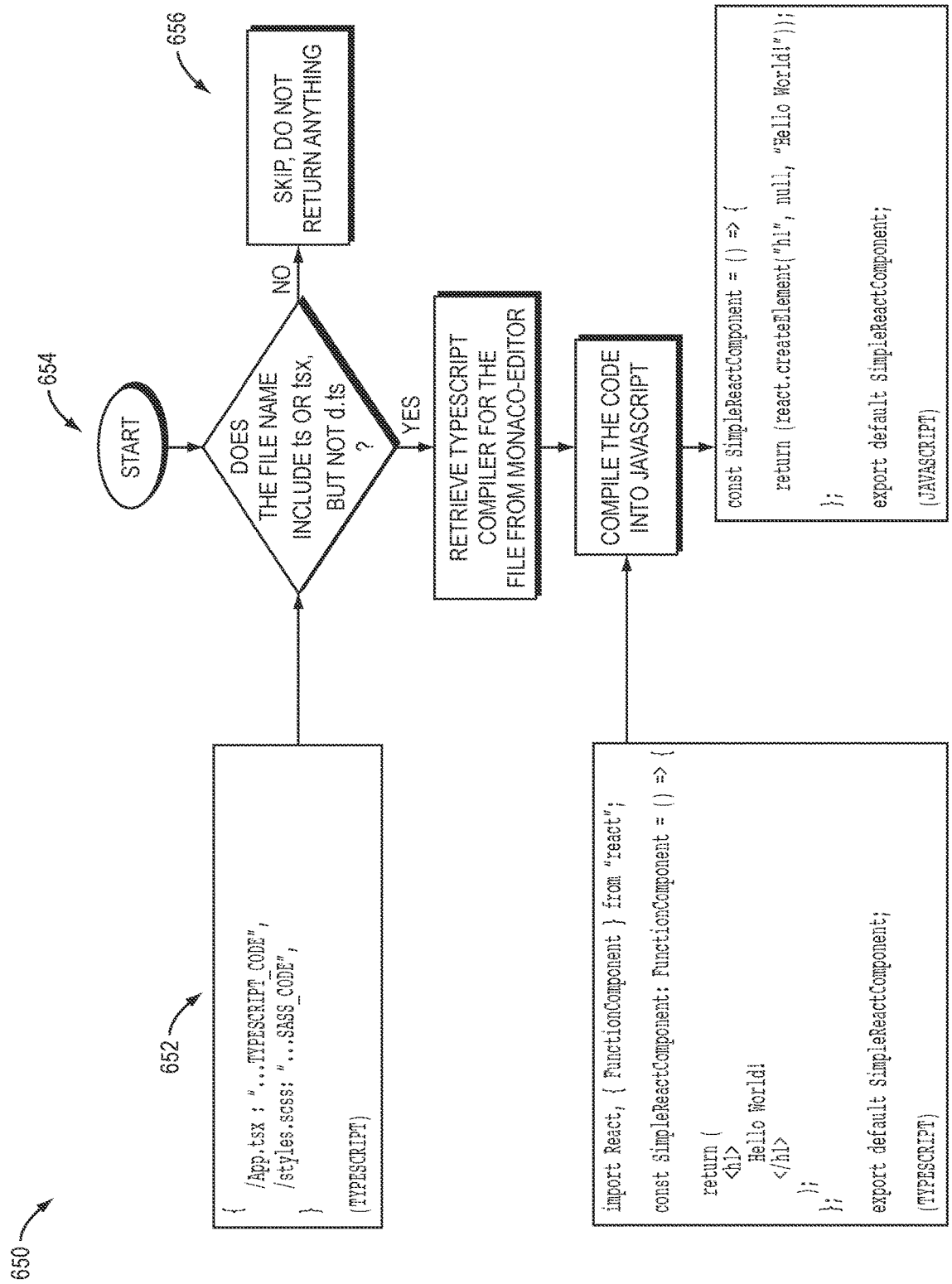
FIG. 6B is a progression of code snippets and specific sub-steps forming a running example that illustrates operations and effects of the steps of FIG. 6A.

FIG. 6A is a flow diagram of an example sequence of steps 600 detailing operations performed as part of FIG. 3A by the code compiler plugin (e.g., the Typescript plugin) 128 to compile code (e.g., transpile Typescript to Javascript). FIG. 6B is a progression 650 of code snippets and specific sub-steps forming a running example that illustrates operations and effects of the steps 600 of FIG. 6A. At step 602 (and illustrated in snippet 652), the returned file contents (e.g., Typescript code or SASS code) from the file resolver plugin 127 are accessed. At step 604 (and illustrated in snippet 654), using the file name and extension, a type of the file contents is determined, and if it is a type that includes code that requires compilation (e.g., Typescript), it is dispatched to be compiled (e.g., into Javascript), for example, by a worker provided by the editor (e.g., the Monaco™ editor) 122. At step 606 (and illustrated in snippet 656), the compiled code (e.g., Javascript) is returned to the bundler 124.

Figure 7A:
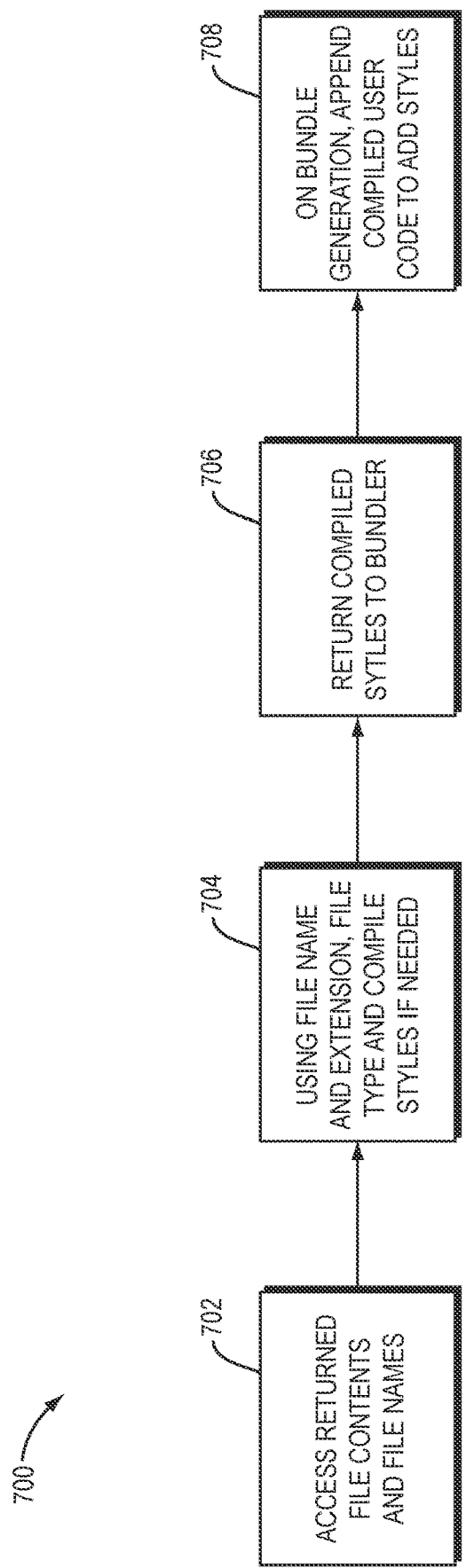
FIG. 7A is a flow diagram of an example sequence of steps detailing operations performed as part of FIG. 3A by the styles plugin (e.g., the SASS plugin) to compile user styles (e.g., SASS to CSS)
Figure 7B:
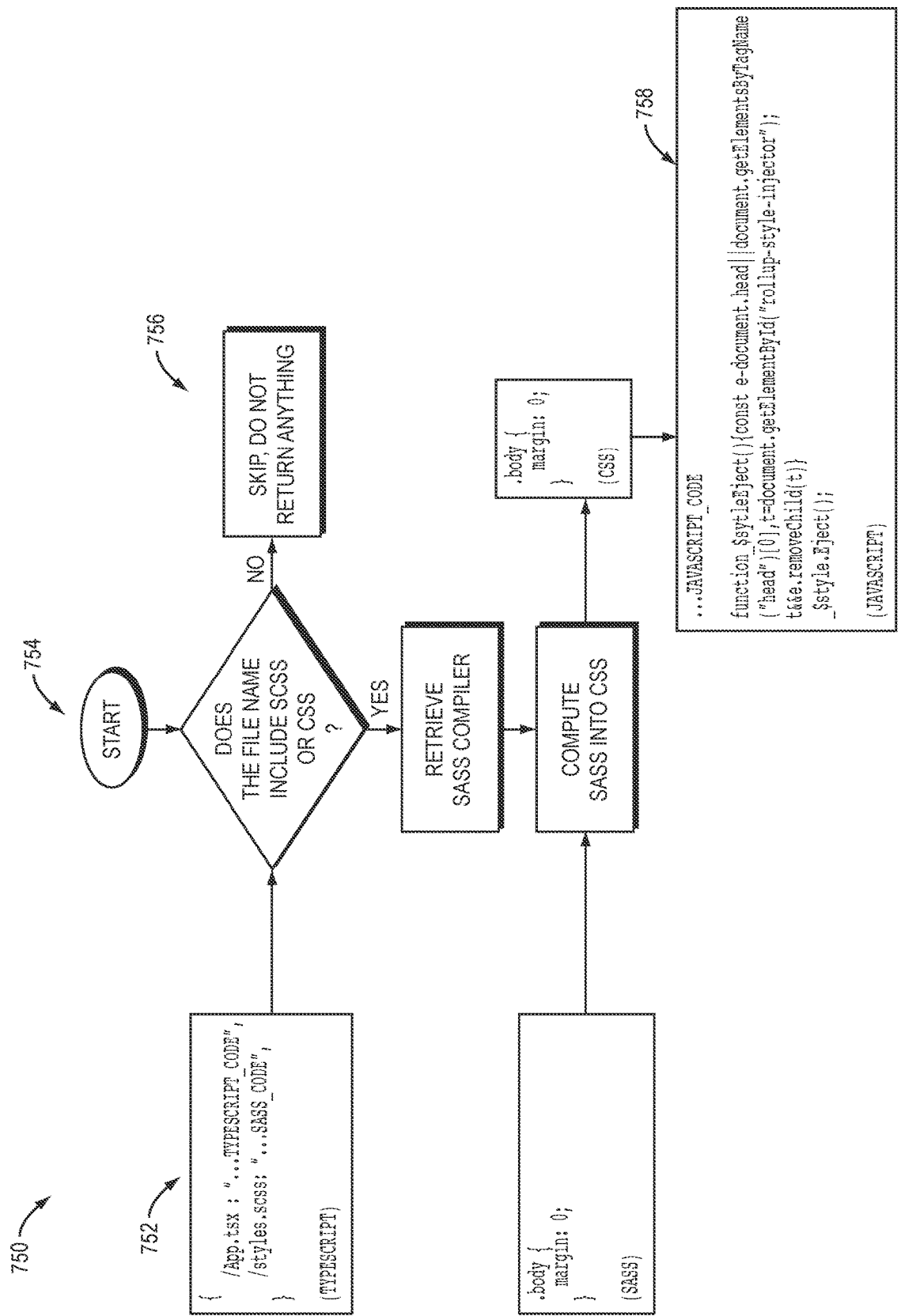
FIG. 7B is a progression of code snippets and specific sub-steps forming a running example that illustrates operations and effects of the steps of FIG. 7A.

FIG. 7A is a flow diagram of an example sequence of steps 700 detailing operations performed as part of FIG. 3A by the styles plugin (e.g., the SASS plugin) 129 to compile user styles (e.g., SASS to CSS). FIG. 7B is a progression 750 of code snippets and specific sub-steps forming a running example that illustrates operations and effects of the steps 700 of FIG. 7A. Conventionally, it is difficult to allow user code to access styles (e.g., SASS or CSS) of a host application. This is, in part, because all styles (e.g., SASS or CSS) of the host application are typically compiled and bundled together (e.g., using a Webpack™ module bundler) as one large file, that is mostly inaccessible. To address this, user supplied styles may be compiled separately. The compiled styles may be bundle together and imported by creating new style elements (e.g., in the head element) of the user code. A setup and cleanup script may be added to the bundle to apply the imported compiled styles and clean up any old styles.

At step 702 (and illustrated in snippet 752), the returned file contents (e.g., Typescript code or SASS code) and file names from the file resolver plugin 127 are accessed. At step 704 (and illustrated in snippet 754), using the file name and extension, a type of the file contents is determined, and if it is a type that includes styles that requires compilation (e.g., SASS) it is dispatched to be compiled (e.g., into CSS), for example, by a styles compiler (e.g., a SASS compiler). At step 706 (and illustrated in snippet 756), the compiled styles code (e.g., CSS) is returned to the bundler 124. At step 708 (and illustrated in snippet 758), upon bundle generation, the user code (e.g., Javascript code) is appended to the compiled styles code.

It should be understood that a wide variety of adaptations and modifications may be made to the techniques. For example, while it is discussed above that the techniques may be used to compile a custom digital twin web application in an online sandbox, it should be understood that the techniques are not limited to use just with creating digital twin web applications. The techniques may applicable in a much broader context, enabling efficient compiling of other types of code (e.g., other Typescript) and other user styles (e.g., other SASS).

Further, in general, functionality may be implemented using different software, hardware and various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as hardware components. Above all, it should be understood that the above description is meant to be taken only by way of example.

What is claimed is:

1. A method for compiling user code, comprising:
receiving, in a browser executing on a local computing device, a request to compile the user code;
retrieving, by a bundler executing in the browser, contents of the user code and dependencies of the user code on one or more host packages of a host application;
appending a magic string to the host package name to produce an appended host package name;
transforming, compiling and bundling the user code by the bundler to produce a compiled bundle, the transforming to import each host package by creating a property of a global window object of the browser that has a property name set to the appended host package name and a property value that is set to an entry point into the host package, wherein the global window object is an object that represents an open browser window of the browser, and the compiling to compile the user code as an extension of the host application in order to utilize the host packages in an already compiled form; and
providing the compiled bundle as an output.

2. The method of claim 1, wherein the user code includes Typescript and the compiling compiles the Typescript to Javascript.

3. The method of claim 1, wherein the transforming comprises:
prefixing the magic string to the host package name.

4. The method of claim 1, wherein the method further comprises:
normalizing the host package name.

5. The method of claim 1, wherein the compiled bundle uses an application configuration of the host application.

6. The method of claim 1, further comprising:
creating a pseudo file system for retrieving files of the user code.

7. The method of claim 1, further comprising:
receiving the user code in an editor executing in the browser,
wherein the bundler compiles the user code by calling a worker of the editor.

8. The method of claim 1, wherein the user code comprises user styles, and the compiling comprises compiling the user styles separately from styles of the host application, and the bundling bundles the user styles and imports them as new style elements.

9. The method of claim 8, wherein the user styles are Syntactically Awesome Style Sheets (SASS) and the compiling the user styles creates Cascading Style Sheets (CSS).

10. A computing device comprising:
a processor; and
a memory coupled to the processor and configured to store a browser that is executable on the processor, the browser when executed operable to:
receive a request to compile user code,
retrieve contents of the user code and dependencies of the user code on one or more host packages of a host application,
append a magic string to the host package name to produce an appended host package name,
import each host package by creating a property of a global window object of the browser that has a property name set to the appended host package name and a property value that is set to an entry point into the host package, wherein the global window object is an object that represents an open browser window of the browser,
compile the user code as an extension of the host application to produce a compiled bundle, and
provide the compiled bundle as an output.

11. The computing device of claim 10, wherein the user code includes Typescript and the compiled bundle includes Javascript.

12. The computing device of claim 10, wherein the browser when executed is further operable to:
prefix the magic string to the host package name.

13. The computing device of claim 10, wherein the browser when executed is further operable to:
normalize the host package name.

14. The computing device of claim 10, wherein the compiled bundle uses an application configuration of the host application.

15. A non-transitory electronic device readable medium having instructions that when executed on one or more processors of one or more electronic devices are operable to:
receive a request to compile user code;
retrieve contents of the user code and dependencies of the user code on one or more host packages of a host application;
append a magic string to the host package name to produce an appended host package name;
transform, compile and bundle the user code by a bundler to produce a compiled bundle, the transforming to import each host package by creating a property of a global window object of the browser that has a property name set to the appended host package name and a property value that is set to an entry point into the host package, wherein the global window object is an object that represents an open browser window of the browser, and the compiling to compile the user code as an extension of the host application in order to utilize the host packages in an already compiled form; and
provide the compiled bundle as an output.

16. The non-transitory electronic device readable medium of claim 15, wherein the user code includes Typescript and the compiled bundle includes Javascript.

17. The non-transitory electronic device readable medium of claim 15, wherein the instructions when executed are further operable to:
normalize the host package name; and
prefix the magic string to the host package name.

18. The non-transitory electronic device readable medium of claim 15, wherein the compiled bundle uses an application configuration of the host application.

19. The non-transitory electronic device readable medium of claim 15, wherein the instructions when executed are further operable to:
create a pseudo file system for retrieving files of the user code.

20. The method of claim 1, wherein the user code comprises user styles, and the instructions when executed are further operable to:

compile the user styles separately from styles of the host application; and bundle the user styles and import them as new style elements.

\* \* \* \* \*

UNITED STATES PATENT AND TRADEMARK OFFICE
CERTIFICATE OF CORRECTION

| | | |
|---|---|---|
| PATENT NO. | : 11,995,458 B1 | Page 1 of 1 |
| APPLICATION NO. | : 17/338116 | |
| DATED | : May 28, 2024 | |
| INVENTOR(S) | : Stefan Retief | |

It is certified that error appears in the above-identified patent and that said Letters Patent is hereby corrected as shown below:

In the Specification

Column 2, Line 39:
"code, rather then requiring a user to provide application"
Should read:
--code, rather than requiring a user to provide application--

Column 5, Line 58:
"However bundlers (e.g., a Rollup™ bundler) typically"
Should read:
--However, bundlers (e.g., a Rollup™ bundler) typically--

Column 6, Line 60:
"web applications. The techniques may applicable in a much"
Should read:
--web applications. The techniques may be applicable in a much--

Signed and Sealed this
Twenty-fourth Day of September, 2024

Katherine Kelly Vidal
*Director of the United States Patent and Trademark Office*